(12) United States Patent
Ogiro et al.

(10) Patent No.: US 7,967,462 B2
(45) Date of Patent: Jun. 28, 2011

(54) BACKLIGHT ASSEMBLY FOR LIQUID CRYSTAL DISPLAY APPARATUS HAVING INCLINED LIGHT EMMITTING ELEMENTS

(75) Inventors: Kenji Ogiro, Yokohama (JP); Nobuo Masuoka, Chigasaki (JP); Kouji Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/361,849

(22) Filed: Jan. 29, 2009

(65) Prior Publication Data

US 2009/0201668 A1 Aug. 13, 2009

(30) Foreign Application Priority Data

Feb. 12, 2008 (JP) ................................ 2008-029873

(51) Int. Cl.
*G09F 13/04* (2006.01)
*G02F 1/13357* (2006.01)

(52) U.S. Cl. ....... 362/97.2; 362/561; 362/626; 362/330; 362/339; 385/146; 349/62; 349/64

(58) Field of Classification Search ........ 362/97.1–97.4, 362/561, 600–634, 26–27, 330, 339, 231, 362/555; 385/146; 349/60–64; 359/831, 359/837
See application file for complete search history.

(56) References Cited

U.S. PATENT DOCUMENTS

| 6,241,358 | B1 * | 6/2001 | Higuchi et al. ............... 362/613 |
| 6,464,367 | B2 * | 10/2002 | Ito et al. ........................ 362/613 |
| 6,580,477 | B1 * | 6/2003 | Cho ................................. 349/65 |
| 6,927,812 | B2 * | 8/2005 | Cho ................................. 349/65 |
| 7,311,431 | B2 * | 12/2007 | Chew et al. .................... 362/613 |
| 7,458,709 | B2 * | 12/2008 | Lang et al. ..................... 362/612 |
| 7,721,672 | B2 * | 5/2010 | Nakano et al. ................ 116/288 |
| 2001/0053072 | A1 * | 12/2001 | Takemoto ....................... 362/31 |
| 2007/0030698 | A1 | 2/2007 | Miyashita |
| 2009/0052163 | A1 * | 2/2009 | Watanabe et al. ............ 362/97.2 |
| 2009/0290097 | A1 * | 11/2009 | Kim et al. ....................... 349/65 |

FOREIGN PATENT DOCUMENTS

| JP | 2006-344409 | 12/2006 |
| JP | 2007-042404 | 2/2007 |
| JP | 2007-134224 | 5/2007 |

OTHER PUBLICATIONS

English Translation of Claims and Detailed Description of Japanese Publication JP 2007-134224.*

* cited by examiner

*Primary Examiner* — Ismael Negron
(74) *Attorney, Agent, or Firm* — McDermott Will & Emery LLP

(57) ABSTRACT

A light source includes a plurality of light emitting elements, and each light emitting element is disposed in such a manner that a direction of an optical axis of the light emitting element having a highest luminance is disposed at a predetermined inclination angle relative to a plane of the liquid crystal display. The optical guide member has an optical guide portion of a wedge shape having a first flat plane generally perpendicular to the optical axis of each light emitting element for receiving light from each light emitting element and a second flat plane having a predetermined angle relative to the optical axis and intersecting the first flat plane at an acute angle for reflecting light. A plurality of optical guide portions are disposed in a plane and formed integrally along a predetermined direction corresponding to the inclination direction of the light emitting elements.

2 Claims, 3 Drawing Sheets

BACKLIGHT ASSEMBLY FOR LIQUID CRYSTAL DISPLAY APPARATUS HAVING INCLINED LIGHT EMMITTING ELEMENTS

INCORPORATION BY REFERENCE

The present application claims priority from Japanese application JP 2008-029873 filed on Feb. 12, 2008, the content of which is hereby incorporated by reference into this application.

BACKGROUND OF THE INVENTION

The present invention relates to a backlight system for a liquid crystal display apparatus, and more particularly to a thin and low-cost liquid crystal display apparatus using light emitting diodes as a backlight and efficiently irradiating light to a liquid crystal display.

In order to further improve an image quality of a liquid crystal display of a thin liquid crystal TV and further thin the display, light emitting diodes are used in some cases as a backlight, in place of a conventional cold cathode fluorescent lamp. As liquid crystal displays are becoming large in size, an LED backlight system is now at a transition stage from a side light type (disposing LED's on the side plane of a liquid crystal display) to a just-under light type (disposing LED's on the back plane of a liquid crystal display) having a short LED radiation distance, from the viewpoint of improving and uniformizing a screen luminance.

Although an LED is generally a point light source having a predetermined directivity, it is necessary for light emitted from LED's to be irradiated to a liquid crystal display as a uniform area light source.

Techniques of obtaining a uniform luminance in an LED backlight system are known as disclosed, for example, in JP-A-2007-42404, JP-A-2006-344409 and JP-A-2007-134224.

Techniques of reducing luminance irregularity, without increasing a thickness of a liquid crystal display the size of which is becoming large, are known as disclosed, for example, in JP-A-2007-134224.

JP-A-2007-42404 discloses techniques of uniformizing a luminance, in the side light type in which light from LED light sources is made to enter from the side plane of an optical guide plate disposed under a liquid crystal panel, by forming a prism as a reflection surface on the optical guide plate, and by gradually changing a prism inclination angle in accordance with a distance from an optical incidence surface.

JP-A-2006-344409 discloses techniques of improving luminance distribution, in a just-under type illumination apparatus for radiating illumination light from the back surface of a liquid crystal display, by forming a concentric concave/convex prism structure on an optical control plate for controlling a light emission direction of each LED light source.

JP-A-2007-134224 discloses techniques of reducing the luminance irregularity and thinning a liquid crystal display large in size, by disposing a just-under type area light source apparatus in such a manner that an optical axis at the highest luminance of LED is slanted relative to an optical guide plate.

SUMMARY OF THE INVENTION

In the backlight system described in JP-A-2007-42404, it states that the prism inclination angle of the reflection surface of the optical guide plate suppresses a luminance irregularity of LED's having optical radiation directivities. However, it considers nothing about the issue of the side light type in which, since the light sources are structured to be disposed at the side of the optical guide plate, as the display panel becomes large, a radiation distance from the light sources disposed at the side becomes longer, and the luminance lowers as the distance to the light source becomes longer. The size of a screen having a predetermined luminance is thus essentially limited.

The illumination apparatus described in JP-A-2006-344409 is of the just-under type having a plurality of LED light sources disposed on the back surface of the liquid crystal display. Since projection distances of the light sources are relatively short, it has no problem with regard to JP-A-2007-42404. In order to expand an illumination area and suppress the luminance irregularity of LED light sources having generally radiation directivities, a direction of each emission light of the light source is controlled by the optical control plate formed with a concentric concave/convex prism corresponding to each LED light source. With JP-A-2006-344409, therefore, the optical control plate is required to be formed in such a manner that each circumference of the concentric concave/convex prism is changed in correspondence with each LED light source and that the concentric concave/convex prisms are formed in a matrix shape. It is concerned that manufacture steps such as molding become complicated.

In the area light source apparatus described in JP-A-2007-134224, although this apparatus is of the just-under type backlight system using LED light sources, it states that the optical axis at the highest luminance of an LED light source is slanted relative to the optical guide plate, and the distance between the LED light source and a diffusion plate is maintained to reduce a luminance irregularity and thin the backlight system. However, although it may be said that JP-A-2007-134224 considers to use high angle radiation light emitted in the direction of the above-described optical axis of the LED light source, it does not consider to effectively use low angle radiation light of the LED light source.

The present invention has been made in view of the above-described issues, and an object of the present invention is to provide a thin and low-cost structure for illuminating uniformly and at high luminance a large area liquid crystal display in the liquid crystal display apparatus using LED's as a backlight.

In order to achieve the above object, the present invention is characterized in the configuration described in the appended claims.

Namely, the present invention provides a liquid crystal display apparatus having a liquid crystal display, a light source disposed on a back side of the liquid crystal display, and an optical guide member for irradiating light from the light source to the liquid crystal display, wherein: the light source includes a plurality of light emitting elements, and each light emitting element is disposed in such a manner that a direction of an optical axis of the light emitting element having a highest luminance is disposed at a predetermined inclination angle relative to a plane of the liquid crystal display; the optical guide member has an optical guide portion of a wedge shape on a plane facing each light emitting element, and the optical guide portion has a first flat plane generally perpendicular to the optical axis of each light emitting element for receiving light from each light emitting element and a second flat plane having a predetermined angle relative to the optical axis and intersecting said first flat plane at an acute angle for reflecting light; and a plurality of optical guide portions are disposed in plan and formed integrally along a predetermined direction corresponding to an inclination direction of the light emitting elements.

With the above-described configuration of the present invention, a large area liquid crystal display in the liquid crystal display apparatus using LED' as a backlight can be made thin, and the liquid crystal display can be illuminated uniformly at high luminance, while the number of light sources is reduced.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will be explained with reference to the accompanying drawings.

Figure 1A:
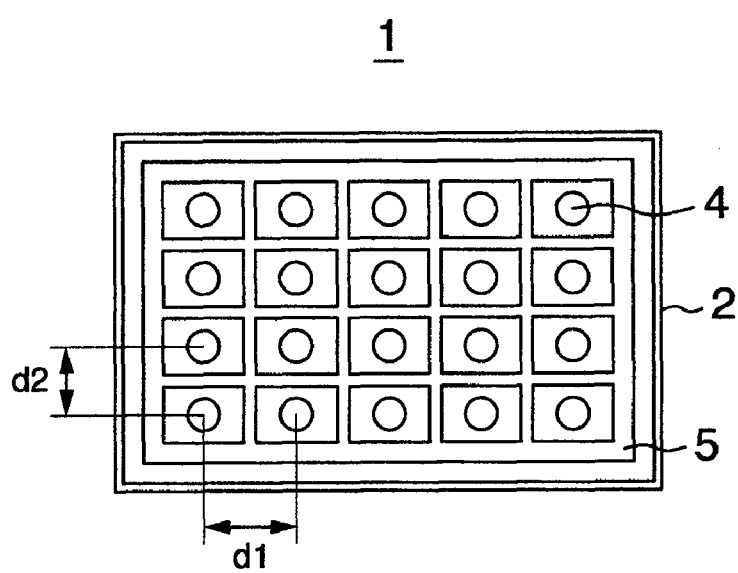
FIGS. 1A and 1B are schematic diagrams showing the structure of a liquid crystal display apparatus.
Figure 1B:
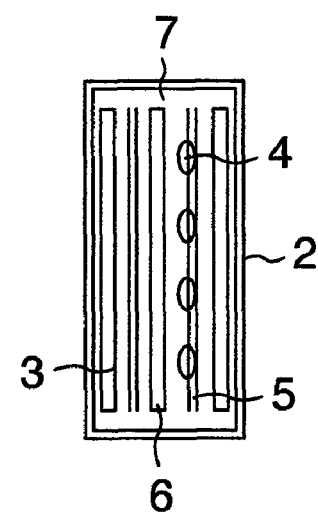

FIGS. 1A and 1B are schematic diagrams showing the structure of a liquid crystal display apparatus. In the front view shown in FIG. 1A, in aid of understanding the explanation easily, some of the constituent components including a liquid crystal display 3, an optical guide member 6, a diffusion member 7 and the like are drawn in seeing through. Disposed in a housing 2 of the liquid crystal display apparatus 1 are the liquid crystal display 3 for displaying information, a plurality of LED light sources (hereinafter simply called "LED's") 4 on the back surface of the liquid crystal display 3, and a substrate 5 on which LED's 4 are disposed in a vertical/horizontal matrix shape. Between the substrate 5 and liquid crystal display, the optical guide member 6 is disposed which illuminates the liquid crystal display 3 at high luminance by changing the point light sources of LED's to an area light source. A diffusion member 7 of a plate or sheet is further provided which illuminates the liquid crystal display 3 uniformly with light emitted from the optical guide member 6. A part or whole of the diffusion member 7 may be formed integrally with the optical guide member 6.

Figure 2:
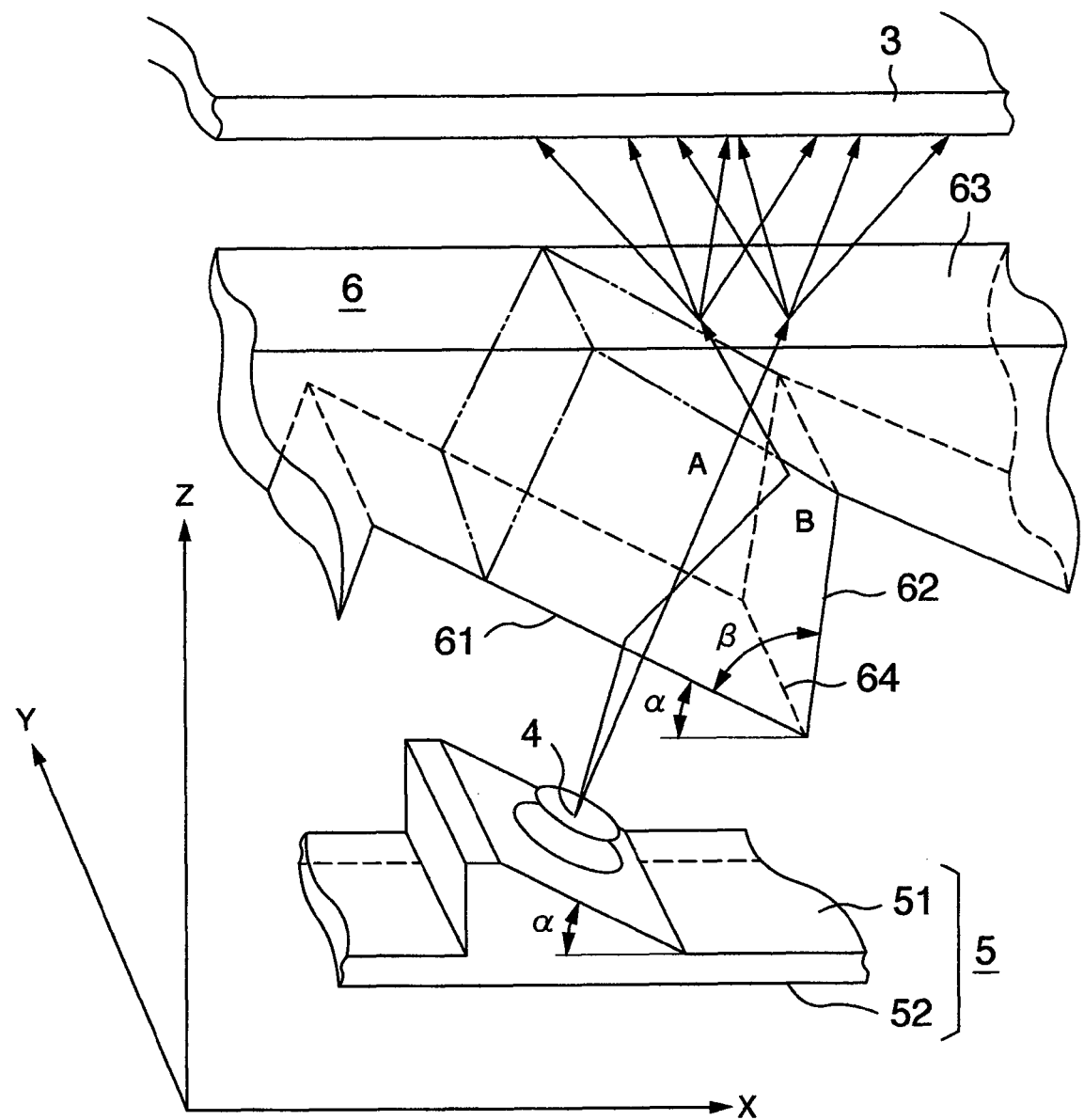
FIG. 2 is a schematic perspective view showing conceptually a backlight apparatus according to an embodiment of the present invention.
Figure 3A:
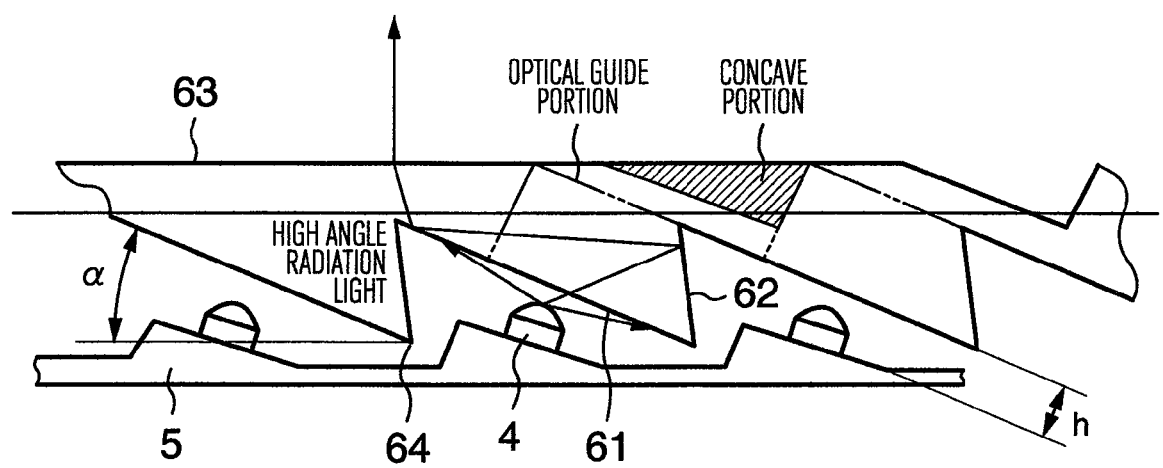
FIGS. 3A and 3B are partial cross sectional views of the backlight apparatus of the present invention.
Figure 3B:
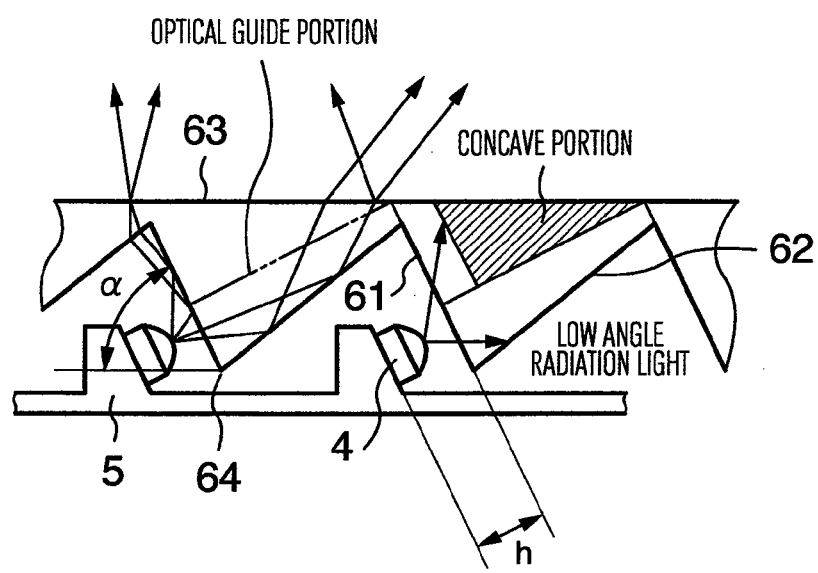

Next, an embodiment of the backlight apparatus regarding the present invention will be explained with reference to FIG. 2 and FIGS. 3A and 3B. FIG. 2 is a perspective view conceptually showing the structure of the backlight apparatus according to the embodiment of the present invention. FIGS. 3A and 3B are partial cross sectional views of the backlight apparatus of the present invention. In FIG. 2, the constituent components are shown such that each is separated in a Z direction for easier understanding. Incidentally, although a part of the backlight apparatus is drawn by using representative components in FIG. 2 and FIGS. 3A and 3B in order to make the constituent components of the backlight apparatus to be easily understood, in an actual backlight apparatus, the plurality of LED's 4 and optical guide member 6 are integrally disposed in the matrix shape in a vertical/horizontal (X, Y) plane as explained above.

Pitches (d1, d2) of LED's 4 disposed in the matrix shape are determined depending on a light amount of LED's 4 and an optical guide performance of the optical guide member 6. Namely, it is set in such a manner that one LED 4 can illuminate a predetermined area of the liquid crystal display 3 at a desired luminance.

Therefore, in the embodiment, the surface area of the substrate 5 mounting the plurality of LED's 4, a projection area of the optical guide member 6 provided for each LED 4 and a flat area of the diffusion member 6 are each approximately equal to a flat display area of the liquid crystal display 3.

In the embodiment shown in FIG. 2, LED's 4 are placed on a flat surface 51 of the substrate 5 on the side of the liquid crystal display 3, and electrically connected for supplying current by wirings (not shown) formed on the flat surface 51 or an opposing flat surface 52 of the substrate 5 by wire bonding or the like. LED 4 has a predetermined directivity of optical radiation. LED 4 is placed on the substrate 5, being slanted by a predetermined angle ($\alpha$). Namely, LED 4 is disposed in such a manner that the optical axis direction at the highest luminance of LED 4 is set at a predetermined inclination angle ($\alpha$) relative to the flat surface of the liquid crystal display 3. Light radiated from LED 4 becomes incident upon the optical guide member 6 disposed facing LED 4.

The optical guide member 6 will now be explained. The optical guide member 6 is made of material having optical transparency such as transparent resin.

The optical guide member 6 is constituted of: a flat plane (first flat plane) 61 for receiving the radiated light from LED 4; an optical guide portion for transmitting incident light; a flat plane (second flat plane) 62 for reflecting the transmitted light; and a flat plane (third flat plane) 63 for outputting incident and guided light (A) and reflected and guided light (B). The first flat plane 61 and second flat plane 62 are intersecting or connecting each other, forming the optical guide member having a triangle shape in a cross section crossing the surface of the liquid crystal display 3, as shown in FIG. 2, to form the optical guide member of a wedge shape to be explained later.

The first flat plane 61 for receiving the radiated light from LED 4 is disposed to form a flat plane generally perpendicular to the optical axis of the highest luminance of LED 4, at a position as near as possible to LED 4, in order to efficiently receive low angle radiation light of LED 4 and illuminate the liquid crystal display 3. Namely, in the embodiment, a ridge line 64 (a connection line between the first flat plane 61 and second flat plane 62 on the substrate 5 side) formed by the first flat plane 61 and second flat plane 62 on the substrate 5 side is positioned more on the substrate 5 side of a plane containing a plurality of LED's 4. In other words, in this embodiment, a portion of the first flat plane 61 and second flat plane 62 is arranged to exist on the plane including the plurality of LED's. In order to efficiently use the low angle radiated light, the ridge line 64 (connection line) is more preferably set as near as possible to the substrate 5 or at a position contacting the substrate 5.

An angle between the first flat surface 61 and the second flat plane 62 is at least not larger than a right angle, i.e., an acute angle ($\beta \leq 90°$). Namely, the first flat plane 61 and the second flat plane 62 constitute a portion of the optical guide member indicated by two-dot lines forming a wedge shape, and form the reflection plane 62 of a predetermined size in order to guide light to a predetermined area. The second flat plane 62 is disposed at the acute angle relative to the first flat plane 61, i.e., a plane perpendicular to the optical axis of the highest luminance of LED 4, so that light incident upon the first flat plane 61 is reflected at an earlier stage to illuminate the plane of the liquid crystal display 3 near at each LED 4 at high luminance. Namely, although this embodiment adopts the side light type backlight system disposing LED's 4 on the side of the optical guide member 6, the optical guide distance of the optical guide member 6 is reduced in order to suppress its size in the Z direction otherwise increased by slanted arrangement.

The emission flat plane (third flat plane) 63 for the liquid crystal display 3 is formed on the optical guide member 6 on the side facing the liquid crystal display 3. Light incident upon the first flat plane 61 transmits through the optical guide portion of the optical guide member 6, is directly output (A) from the third flat plane facing the liquid crystal display 3 or transmits through the optical guide portion, is reflected by the second flat plane 62, transmits through the optical guide portion, and is output (B) from the third flat plane 63. The output light is diffused by a diffusion pattern (not shown) formed on the third flat plane 63 or by the diffusion member provided between the liquid crystal display 3 and optical guide member 6, to thereby uniformly illuminate the liquid crystal display 3.

In order to diffuse the output light from the third flat plane, although one of the diffusion pattern formed on the third flat plane 63 or the diffusion member may be used, it is needless to say that both may be used. In FIG. 2, although the diffusion member 7 is shown omitted in aid of understanding the behavior of output light from the third flat plane, this does not mean that the diffusion member 7 is not necessary to be used in the embodiment.

FIGS. 3A and 3B show examples of the arrangement of LED's 4 and optical guide member 6 at different inclination angles of the optical axis of LED 4 relative to the plane of the liquid crystal display 3. FIG. 3A shows an example of the arrangement at a relatively small inclination angle (α) of the optical axis of LED 4 relative to the plane of the liquid crystal display 3. This example ensures a relatively broad area of the first flat plane 61 upon which radiated light from LED 4 becomes incident so that it is suitable for LED's having the directivity characteristics of radiation light of LED's 4 having a relatively high angle radiation tendency (i.e., an intensity of output light in the optical axis direction of LED 4 is relatively strong and the output light directivity is strong). FIG. 3B shows an example of the arrangement at a relatively large inclination angle (α) of the optical axis of LED 4 relative to the plane of the liquid crystal display 3. This example ensures a relatively broad area of the second flat plane 62 for reflecting incident light upon the first flat plane 61 so that it is suitable for LED's having the directivity characteristics of radiation light of LED's 4 showing a relatively low angle radiation tendency (i.e., an intensity of output light in the optical axis direction of LED 4 is relatively weak and the output light directivity is weak). Both the examples constitute the optical guide member indicated by two-dot lines and containing the first flat plane 61 and second flat plane 62.

These arrangements are applicable to the side light type backlight system by disposing LED's 4 and the optical guide member 6 near to each other, and low angle light from LED's 4 can be guided to a wider area. Since LED's 4 and the optical guide member 6 are disposed slanted by the inclination angle (α), an optical guide length of the optical guide member can be reduced. It is therefore possible to suppress the illumination intensity of the backlight from being lowered by the optical guide member. Further, by broadening the first flat plane 61 and second flat plane 62 of the optical guide member 6, a larger amount of high angle radiation light of LED 4 can be made incident so that a loss of the light amount of LED 4 can be suppressed and light can be used effectively. Further, since the optical guide member 6 is positioned under LED's 4 along the direction (Z) perpendicular to the plane of the liquid crystal display 3, a dark area will not be formed at the bottom of LED 4.

As explained above, the backlight apparatus of the embodiment can illuminate the surface of the liquid crystal display 3 with radiation light of LED's uniformly and at high luminance.

Further, in this embodiment, since the optical guide member 6 is structured as explained above, it is possible to shorten a distance between LED's 4 and the liquid crystal display 3. According to the present invention, it is therefore possible to realize a thin liquid crystal display apparatus by suppressing the size along the direction perpendicular to the plane of the liquid crystal display 3, i.e., the side along a thickness direction (Z direction) of the liquid crystal display 3.

The optical guide member 6 can be used as an optical guide member of the side backlight type by forming recesses on the third flat plane 63 as indicated by hatched portions in FIGS. 3A and 3B. If the optical guide member 6 of the embodiment is used for a just-under type LED backlight, an optical transmission range of the optical guide member can be expanded because each optical guide portion is formed in correspondence with the arrangement of LED's 4. Accordingly, the number of LED's 4 can be reduced and a transmission length of the optical guide member for each LED can be shortened. It is therefore possible to irradiate light from LED's 4 to the liquid crystal display at high luminance, while a cost rise is suppressed. Furthermore, since the optical guide member 6 of this embodiment has planes for reflection/output of incidence light, a complicated diffusion pattern is not necessary to be provided for each LED 4.

As explained so far, according to the embodiment, it is possible to uniformly irradiate light from the light source (LED) to a liquid crystal display, while the liquid crystal display apparatus is made thin and the cost is suppressed. According to the embodiment, it is therefore possible to provide a liquid crystal display apparatus which realizes high luminance, thinning and low cost.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A liquid crystal display apparatus comprising:
a liquid crystal display;
a light source disposed on a back side of said liquid crystal display; and
an optical guide member for irradiating light from said light source to said liquid crystal display, wherein:
said light source includes a substrate and a plurality of light emitting elements mounted on said substrate, and each light emitting element is disposed in such a manner that a direction of an optical axis of said light emitting element having a highest luminance is disposed at a predetermined inclination angle relative to a plane of said liquid crystal display;
said optical guide member has an optical guide portion having a wedge shape on a plane facing each light emitting element, and said optical guide portion has a first flat plane generally perpendicular to said optical axis of each light emitting element for receiving light from each light emitting element and a second flat plane having a predetermined angle relative to said optical axis and intersecting said first flat plane for reflecting light;

a ridge line formed by said first flat plane and said second flat plane is positioned closer to the substrate than a plane including portions of said plurality of light emitting elements furthest from the substrate;

both high angle radiation light and low angle radiation light emitted from each light emitting element are incident on said first flat plane facing said light emitting element; and a plurality of said optical guide portions are disposed in a plane and formed integrally along a predetermined direction corresponding to the inclination direction of said light emitting elements.

2. The liquid crystal display apparatus according to claim 1, wherein said optical guide member has a fine concave/convex pattern formed on a plane on an output plane side facing said liquid crystal display, and said fine concave/convex pattern diffuses light from said light source incident upon said optical guide member and outputs diffused light to said liquid crystal display.

* * * * *